United States Patent [19]

Hancock

[11] 4,389,691

[45] * Jun. 21, 1983

[54] SOLID STATE ARC SUPPRESSION DEVICE

[75] Inventor: Harold E. Hancock, Cincinnati, Ohio

[73] Assignee: Power Management Corporation, Centerville, Ohio

[ * ] Notice: The portion of the term of this patent subsequent to Feb. 17, 1998, has been disclaimed.

[21] Appl. No.: 254,694

[22] Filed: Apr. 16, 1981

Related U.S. Application Data

[63] Continuation-in-part of Ser. No. 49,852, Jun. 18, 1979, abandoned.

[51] Int. Cl.³ .......... H02H 7/22

[52] U.S. Cl. .......... 361/8; 361/3; 361/6; 361/7; 361/13; 307/135

[58] Field of Search .......... 361/8, 13, 3, 4, 6, 361/7, 2, 3, 5; 307/135, 134

[56] References Cited

U.S. PATENT DOCUMENTS 3,237,030 2/1966 Coburn .......... 361/8
3,260,894 7/1966 Denault .......... 361/8
3,401,303 9/1968 Walker .
3,555,353 1/1971 Casson .......... 361/13
3,588,605 6/1971 Casson .......... 361/13
3,639,808 2/1972 Ritzow .......... 361/13
3,982,137 9/1976 Penrod .......... 361/8
4,025,820 5/1977 Penrod .......... 361/8
4,068,273 1/1978 Metzler .......... 361/3

FOREIGN PATENT DOCUMENTS 2613929 10/1977 Fed. Rep. of Germany .
1206696 9/1970 United Kingdom .
1311310 3/1973 United Kingdom .

*Primary Examiner*—Patrick R. Salce
*Attorney, Agent, or Firm*—Biebel, French & Nauman

[57] ABSTRACT

An arc suppression device (40) for protecting the load carrying contacts (30, 31, 32) of a power contactor (20) includes gate controlled semiconductor devices (TR1, TR2, TR3) connected in parallel with the contacts. A signal from a control circuit (45) causes gating current to be applied to the semiconductor devices nearly simultaneously with the application of current to and removal of current from the solenoid (25) of the power contactor. Circuit means (90) responds to the control signals to provide gating current for a limited period of time prior to, during and following the closing of the contacts. Gating current is not continued after the contacts have closed to protect the semiconductors from possible damage. Additional circuit means (110) responds to the removal of the control signal to provide gating current for a limited period of time prior to, during and following the opening of the contacts. An isolation relay (120) may be provided to prevent leakage current from flowing through the semiconductor devices to the load while the power contacts are open.

12 Claims, 7 Drawing Figures

SOLID STATE ARC SUPPRESSION DEVICE

RELATED APPLICATION

This application is a continuation-in-part of application Ser. No. 049,852, filed June 18, 1979, now abandoned, and assigned to the same assignee.

BACKGROUND OF THE INVENTION

This invention relates to an arc suppression device which may be connected to existing power contactors substantially to eliminate arcing between the contacts thereof.

Semiconductor devices have been placed in parallel with the contacts of power contactors to reduce or suppress arcing during contact closure and opening, as shown in U.S. Pat. Nos. 3,260,894; 3,555,353; 3,639,808; 3,982,137 and 4,025,820.

In U.S. Pat. Nos. 3,260,894; 3,982,137 and 4,025,820, gating current to a semiconductor arc suppressing device is provided by an auxiliary contact connected mechanically to the movable contact of a power contactor. This auxiliary contact is designed to close prior to and open following the opening and closing of the power contacts so that the semiconductor device would be provided with gating current during that interval, but not while the main contacts were closed so that the semiconductor device would not be required to carry current continuously should the main contacts fail to close or close with an appreciable resistance therebetween.

U.S. Pat. No. 4,025,820 also discloses a protection current to prevent leakage current from flowing through the semiconductor device while the power contacts are open.

In all of the above devices, some modification or redesign of the power contactor or its associated control circuitry is necessary in order to incorporate the arc suppression means.

In copending U.S. application Ser. No. 7,947, filed Jan. 31, 1979, now U.S. Pat. No. 4,251,845, issued Feb. 17, 1981, assigned to the same assignee as the present invention, current is applied to the semiconductor devices before current is applied to or removed from the coil of the power contactor.

SUMMARY OF THE INVENTION

In the present invention, an arc suppression device is connected to an existing power contactor to protect the contacts thereof. Current is applied nearly simultaneously to the power contactor solenoid and to the gate electrodes of the semiconductor arc suppression devices.

The present invention is a solid state device which is connected to the contacts of an existing power contactor and to the power contactor solenoid, and controls the operation of the solenoid and provides protection from arcing at the contacts in response to external control signals.

The device responds to externally generated control signals and causes gating current to be applied to semiconductor arc suppression devices or gate controlled thyristors, preferably triacs, connected in parallel with each of the contacts of the power contactors. While the semiconductor devices will be referred to hereinafter as triacs, it is understood that other gate controlled thyristors, such as silicon controlled rectifiers (SCRs), are to be included within the scope of this invention.

Gate current is applied to the triacs prior to, during and following both the opening and the closing of the contacts, but gating current is not continued after the power contacts have either completely closed or fully opened. The triacs are thus protected against damage should the power contacts fail to close completely.

During the closing sequence, the triacs are gated on for approximately thirty to fifty milliseconds in order to insure that all contact bounce has ceased before the triac is disabled. Even under full load, the triacs will not be damaged during this delay period. Similarly, a thirty to fifty millisecond delay is provided during contact opening to insure that the contacts open completely before gating current is removed from the triacs.

In the present invention, gating current is supplied to the triacs nearly simultaneously with the application of current to the solenoid of the power contactor; but since there is a delay of approximately eight milliseconds between the time current is applied to the solenoid and the time the contacts actually close, no arcing will occur because the triacs will have been gated on.

Similarly, upon removal of the control signal, gating current is again applied to the triacs for a limited period of time, and simultaneously, current is removed from the power contactor solenoid, thus allowing the contacts thereafter to open. Again, there is an inherent delay between the removal of current from the solenoid and the opening of the contacts, and the triacs will be gated on during this interval to protect the contacts during the opening sequence.

An isolation relay may be provided having contacts connected in series with the triacs to prevent leakage current from flowing therethrough. An additional contact insures that the solenoid of the power contactor is not energized and gating current is not applied to the triacs until the isolation relay has operated. Time delay means are provided to insure the isolation relay contacts do not open while current is flowing through the triacs.

Accordingly, it is an object of this invention to provide apparatus adapted to be connected to an existing power contactor without modification thereof, which power contactor includes a solenoid connected to operate at least one pair of power contacts, said apparatus controlling the operation of the power contactor in response to an externally generated control signal and for suppressing arcing at the power contacts during opening and closing thereof, said apparatus including gate controlled thyristor means connectable in parallel with each of said power contacts, means for providing a source of direct current for the gate of each said thyristor means, first solid state circuit means responsive to the application of the control signal for applying current to the solenoid of said power contactor and for applying gating current to said thyristor means prior to, during, and for a limited period of time following closure of the power contacts, and second solid state circuit means responsive to the removal of the control signal for removing current from the solenoid and for applying gating current to said thyristor means prior to, during, and for a limited period of time following the opening of the power contacts.

It is a further object of this invention to provide apparatus adapted to be connected to an existing power contactor without modification thereof, which power contactor includes a solenoid connected to operate at least one pair of power contacts, said apparatus controlling the operation of the power contactor in response to an externally generated control signal and for suppressing arcing at the power contacts during either opening or closing thereof, said apparatus including gate controlled thyristor means connectable in parallel with each of said power contacts, means responsive to the application or removal of said control signal for controlling current to said power contactor solenoid and for generating an output signal which exists for a period of time prior to, during, and for a limited period following the opening or closing of said power contacts, oscillator means responsive to said output signal for generating a source of high frequency alternating current, and means for connecting the output of said oscillator to the gate electrodes of each said thyristor means.

Other objects and advantages of the invention will be apparent from the following description, the accompanying drawings and the appended claims.

DESCRIPTION OF THE PREFERRED EMBODIMENTS

Figure 1:
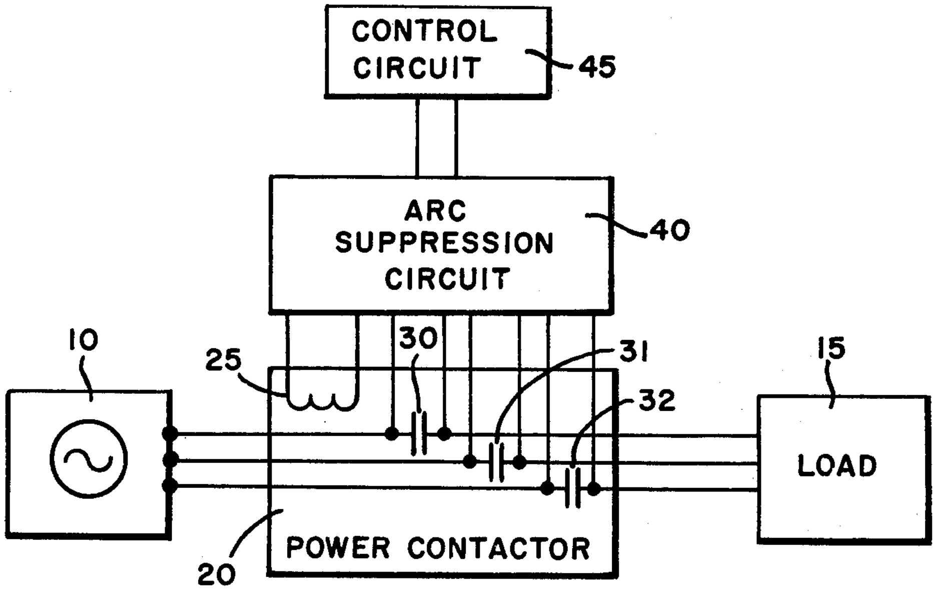
FIG. 1 is a simplified electrical block diagram illustrating an arc suppression device constructed according to this invention.

Referring now to the drawings which show a preferred embodiment of the invention, and particularly to the block diagram of FIG. 1, an alternating current source 10 is connected to a load 15 through a power contactor 20. The power contactor 20 includes a coil or solenoid 25 for controlling power contacts 30, 31 and 32. While three contacts are illustrated, it is understood that the power contactor may include one or more contacts, and it may also include auxiliary contacts.

A solid state arc suppression device 40 is connected to the power contactor 20 to control the operation of the solenoid 25 and to provide arc protection for the contacts 30, 31 and 32.

A control circuit 45, controls the operation of the arc suppression circuit 40. The control circuit and the arc suppression device may draw power from the alternating current source 10. Both the power contactor 20 and the control circuit 45 may form part of a preexisting system.

The solid state arc suppression circuit 40 is shown in detail in FIG. 2 and includes a gate power supply 50 and a low voltage power supply 55. The gate power supply 50 includes a transformer T1 having its primary windings connected to terminals 57 and 58. The primary windings of transformer T2 or the low voltage power supply are also connected to terminals 57 and 58 which are in turn connected to a source of alternating current, such as from the power source 10.

While two separate transformers T1 and T2 are shown in FIG. 2, it is to be understood that a single transformer having multiple secondary windings could be used instead.

Transformer T1 in the gate power supply 50 includes three windings 61, 62 and 63, connected respectively to bridge rectifiers DB1, DB2 and DB3, and filter capacitors CB1, CB2 and CB3. The gate power supply provides a direct current source of gating current for the semiconductor devices or triacs TR1, TR2 and TR3 connected in parallel with the power contacts 30, 31 and 32.

The low voltage power supply 55 includes diodes D1 and D2 connected to the center tapped secondary winding, a filter capacitor C1, a resistor R1 and a Zener diode Z1. This power supply provides a source of direct current on terminals 65 and 66 to operate those components within the arc suppression circuit.

The control circuit 45 is connected to terminals 70 and 71 of the arc suppression circuit. The control voltage is usually an alternating current voltage and is connected to an optical isolator OI-5 including a light emitting diode (LED) and Darlington amplifier. Whenever the LED is illuminated, the Darlington amplifier conducts. This circuit will also work on a direct current input if proper polarity is observed. When used with an alternating current control voltage, however, it is preferred to use filter capacitor C2 and resistor R4. A direct current control signal will then appear on line 75 whenever a control voltage is applied to terminals 70 and 71.

The arc suppression circuit 40 shown in FIG. 2 includes means responsive to the application of control signals for energizing the solenoid of the power contactor and for gating the triacs TR1, TR2 and TR3 on for a limited period of time, prior to, during and following the closing of the power contacts.

The voltage on line 75, which represents the control signal, is connected through an inverter circuit 80 to an optical isolator OI-4, the other side of which is connected to terminal 65 of the low voltage power supply 55. The optical isolator controls gate current to triac TR4 placed in series with the solenoid 25 of the power contactor 20. Therefore, whenever a control signal appears on line 75, the solenoid of the power contactor will be energized. The power contacts 30, 31 and 32 will begin to close, however, it is recognized that it takes at least eight to ten milliseconds from the application of current to the power contactor for the contacts actually to close.

Control line 75 is also connected through inverters 82 and 84 to circuit means 90. In a preferred embodiment, circuit means 90 is a data transfer type of flip-flop, but it is to be understood that other types of equivalent circuits, such as one-shots, might also be used. Circuit means 90 is responsive to the application of the control signal and will provide gating current to the triacs for a limited period of time.

Circuit means 90 includes a clock input 91 which causes whatever data is present on data input line 92 to be transferred to the output Q1. Since the data input 92 is connected to terminal 65 through resistor R5, then Q1 will become positive whenever the voltage on the clock input 91 rises to the required level. The circuit 90 was chosen for this purpose because it is not sensitive to the rate at which the voltage at its clock input 91 rises.

Output Q1 is connected to a time delay circuit 95 including resistor RT1 and capacitor CT1. This delay circuit is connected to the reset input 96, and after approximately thirty milliseconds, the circuit means 90 will be reset, and Q1 will return to essentially ground potential, notwithstanding the continued positive voltage on clock input 91.

During this limited period of time that Q1 output rises to the direct current level of line 65, diode D4 will conduct and cause the input to inverter 100 to go positive and its output 101 to drop to zero potential. (Previously, the output of the inverter 100 was positive due to the action of resistor R6). This inverter is connected to optical isolators OI-1, OI-2 and OI-3 placed in series with the gate electrodes of the triacs TR1, TR2 and TR3. Therefore, upon the application of a control signal on line 75, the gate electrodes of the triacs will immediately be provided with a direct current voltage from the gate power supply 50, and that voltage will continue for the limited period of time determined by the values of RT1 and CT1 in delay circuit 95.

The arc suppression circuit is also with means responsive to the removal of control signals for deenergizing the solenoid and for gating the triacs on for a limited period of time, prior to, during and following the opening of the power contacts. Whenever the control voltage is removed from terminals 70 and 71, the control signal on line 75 will be removed, causing the optical isolator to remove gating current to triac TR4, and therefore the solenoid 25 of the power contactor will be deenergized. This will allow the contacts 30, 31 and 32 to open, but not until after a time delay which is inherent to power contactors of this type.

Control line 75 is also connected through inverter circuit 82 to the circuit means 110. This is also a data transfer type flip-flop wherein the signal level of line 65 applied to input 112 will be transferred to the Q2 output on receipt of the signal on input 113. Thus, when the voltage on line 75 is removed, the voltage level on line 65 will be transferred through Q2 to diode D5 and to the inverter circuit 100. This will cause gating current to be applied through the optical isolators OI-1, OI-2 and OI-3 to the gates of triacs TR1, TR2 and TR3. The circuit means 110 will be reset following a time delay determined by circuit 110, including resistor RT2 and capacitor CT2, which applies a reset signal at terminal 116, in a manner similar to that described in connection with circuit means 90. The values of RT2 and CT2 are selected to give an approximately thirty millisecond delay or whatever time might be necessary for the contacts of the power contactor to open completely.

In some environments, it may be desirable to provide an isolation relay having contacts connected in series with the triacs to prevent leakage current from flowing through the triacs to the load when the power contactor is off. FIG. *2a* shows an isolation relay 120 having a coil connected to the output of bridge rectifier DB4, the input to which is connected to the control circuit 45 through terminals 70 and 71. Resistor RI limits the peak current flow to capacitor CI and also limits the maximum voltage across the coil of the relay. Contacts I1, I2 and I3 are placed in series with the triacs TR1, TR2 and TR3, respectively. Contact I4 is placed in line 75 (FIG. *2b*) to prevent the solenoid 25 of power contactor 20 from being energized and also inhibits the application of gating current to the triacs through circuit means 90. Contact I4 preferably is designed to close shortly after the other contacts to insure that the triacs will not be provided with gating current prematurely and thus subject contacts I1, I2 and I3 to arcing conditions.

Upon the removal of the control voltage at terminals 70 and 71, isolation relay 120 will open, but not until after a time delay determined by capacitor CI and the resistance of the relay coil. This time delay, typically in the order of sixty milliseconds, is made long enough to insure that gating current is removed from the triacs before the isolation contacts open to prevent any arcing at those contacts.

Figure 3:
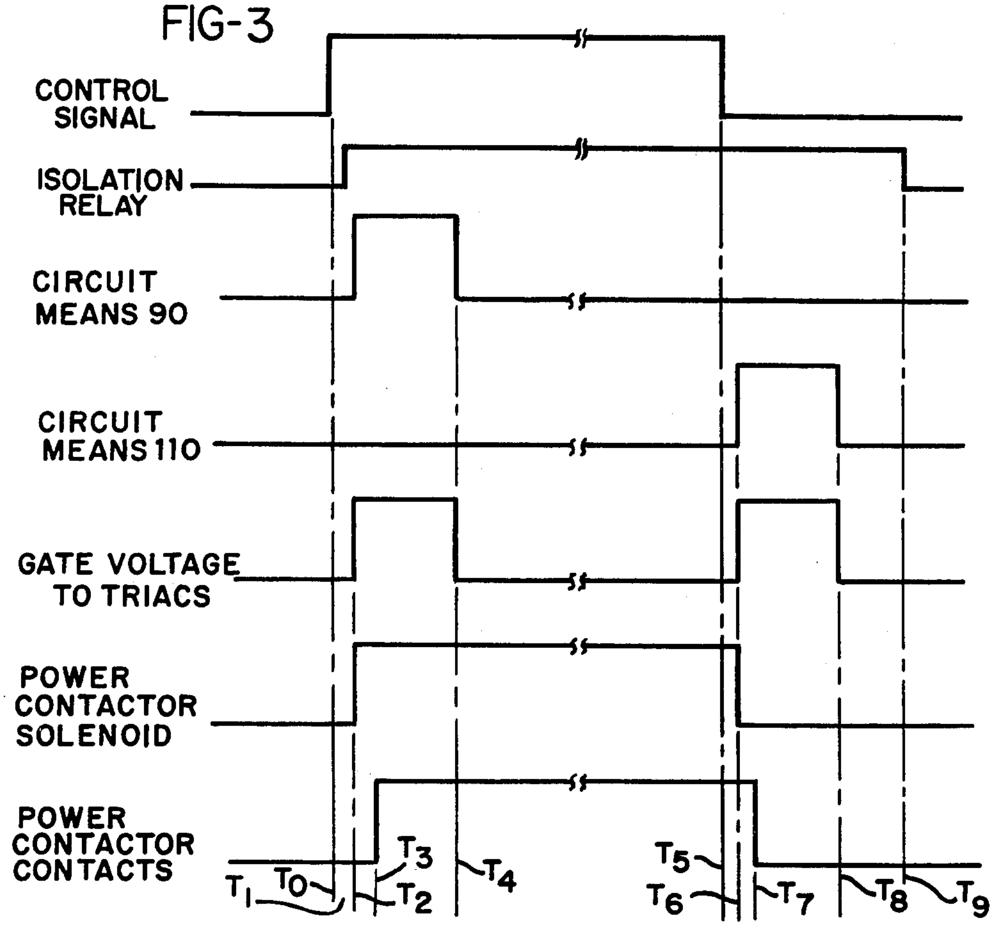
FIG. 3 is a timing diagram illustrating the operation of the embodiment shown in FIGS. 2*a* and 2*b*.

Referring now to FIG. 3, which illustrates the operation of the device, the application of a control signal at time T0 will result in the voltage on line 75 rising sufficiently to actuate or initiate the operation of the circuit means 90 at time T2, and as a result gating current will be applied to the gates of the triacs. Also, at time T2, there will be sufficient voltage to gate on triac TR4 to energize the solenoid 25 of the power contactor, however, the power contacts 30, 31 and 32 will not close until time T3. After a limited time delay, the circuit means 90 will be deenergized at time T4, and the gating current to the triacs will be removed.

When the control signal on terminals 70 and 71 is removed, at time T5, circuit means 110 will be activated at time T6, again causing gating current to be applied to the triacs. The solenoid 25 will be deenergized at the same time, or at nearly the same time, and thereafter the contacts 30, 31 and 32 will open at time T7. Circuit means 110 will reset after a limited period of time at T8, after a delay sufficient to allow the power contacts to open completely.

It will be noted that while there is near simultaneous application of control signals to the solenoid of the power contactor and to the gate electrodes of the semiconductor devices or triacs which protects the contacts of the power contactor, the contacts will nevertheless be protected against arcing by operation of the circuit means 90 and 110. Also, while the main contacts 30, 31 and 32 are closed, no gating current is applied to the triacs, and therefore should those contacts fail to close or close with an appreciable resistance therebetween, current would not continue to flow through the triacs causing ultimate damage thereto. The time during which the triacs are gated on is limited so that they are able to carry the full load without any damage thereto but the time is sufficiently long to protect the contacts from arcing.

In those applications requiring an isolation relay, the relay contacts will close at time T1, as shown in FIG. 3, shortly after the application of the control signal, and the closing of these contacts will enable the power contactor solenoid and the circuit means 90 to function in the manner previously described. Following the removal of the control signal at time T5, and after the gating current has been removed from the triacs at time T8, the isolation relay contacts will open at time T9.

The following table lists the components, and their values, used in the embodiment shown in FIGS. *2a* and *2b*.

TABLE OF COMPONENTS
(FIG. 2)

| RESISTORS (in ohms) | | CAPACITORS (in mfd) | |
|---|---|---|---|
| R1 | 47 | C1 | 100, 25V |
| R2 | 11K | C2 | 100, 15V |
| R3 | 1K | CB1–CB3 | 20, 25V |
| R4 | 220 | CP1–CP4 | 0.1, 1KV |
| R5 | 10K | CT1–CT2 | 3 |
| R6 | 33K | CI | 200, 200V |
| R7 | 820 | | |
| R8 | 560 | | |
| RS1–RS3 | 100 | | |
| RG1–RG3 | 100 | | |
| RG4, RI | 200 | | |
| RP1–RP4 | 100 | | |
| RT1–RT2 | 10K | | |

-continued

| TABLE OF COMPONENTS (FIG. 2) | |
|---|---|
| OTHER COMPONENTS | |
| D1-D5 | diodes, 1N4001 |
| DB1-DB4 | bridge rectifiers, 50V, 200 ma |
| T1 | transformer, Stancor, P8361 |
| T2 | transformer, Stancor, P8395 |
| TR1-TR3 | triac, Unitrode, 2B0620-8F |
| TR4 | triac, GE, SC116 |
| OI-1-OI-3, OI-5 | optical isolator, H11B1 |
| OI-4 | optical isolator, Motorola MOC 3011 |
| 90, 110 | data transfer flip-flop, RCA CD 4013 BE |
| 80, 82, 84, 100 | inverters, CD-4049 |
| 120 | Relay, Potter Brumfield PMI704 110VDC, 3000 ohm coil. |

Figure 2A:
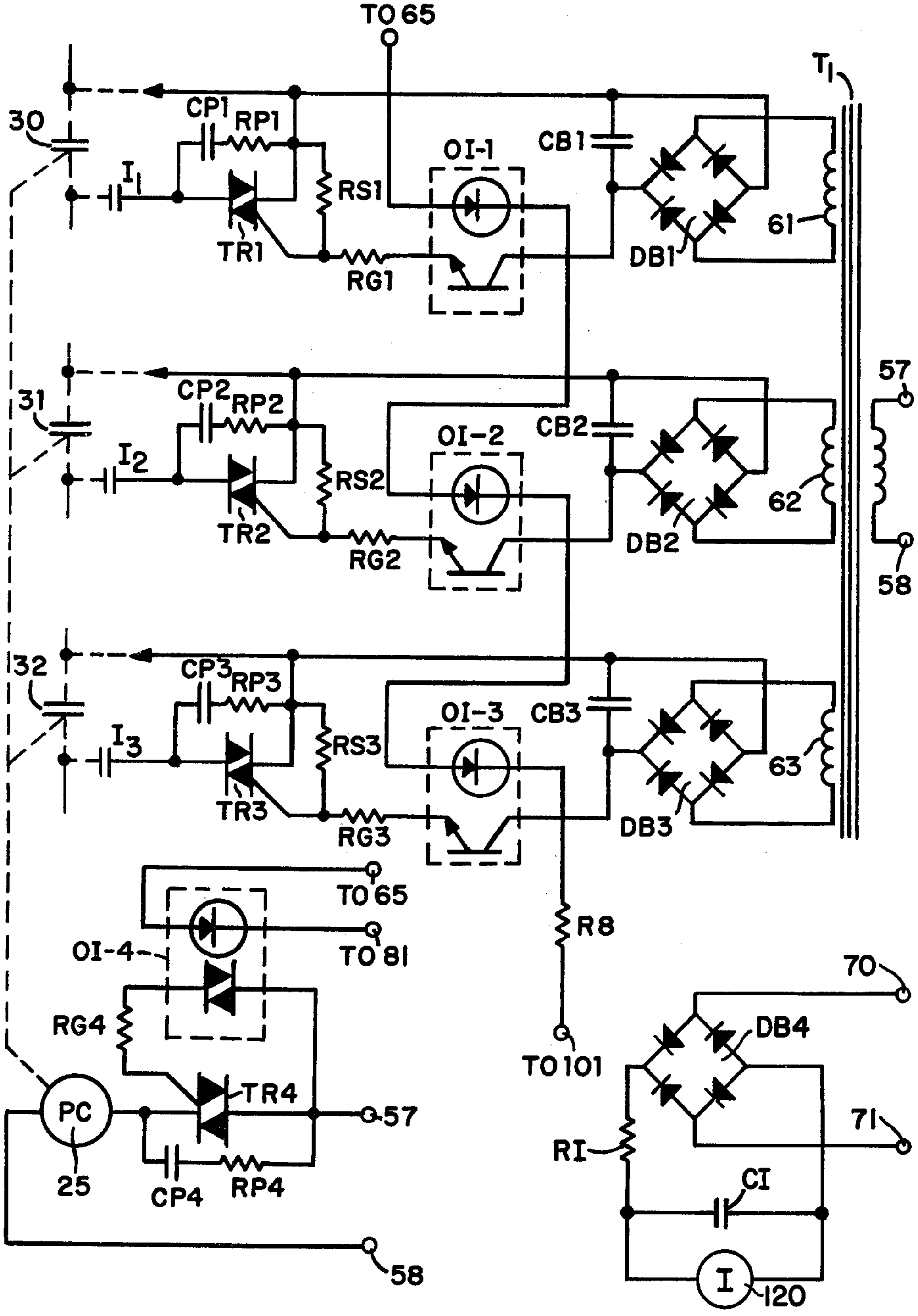
FIGS. 2*a* and 2*b* together are an electrical schematic diagram of a preferred embodiment of the invention.
Figure 2B:
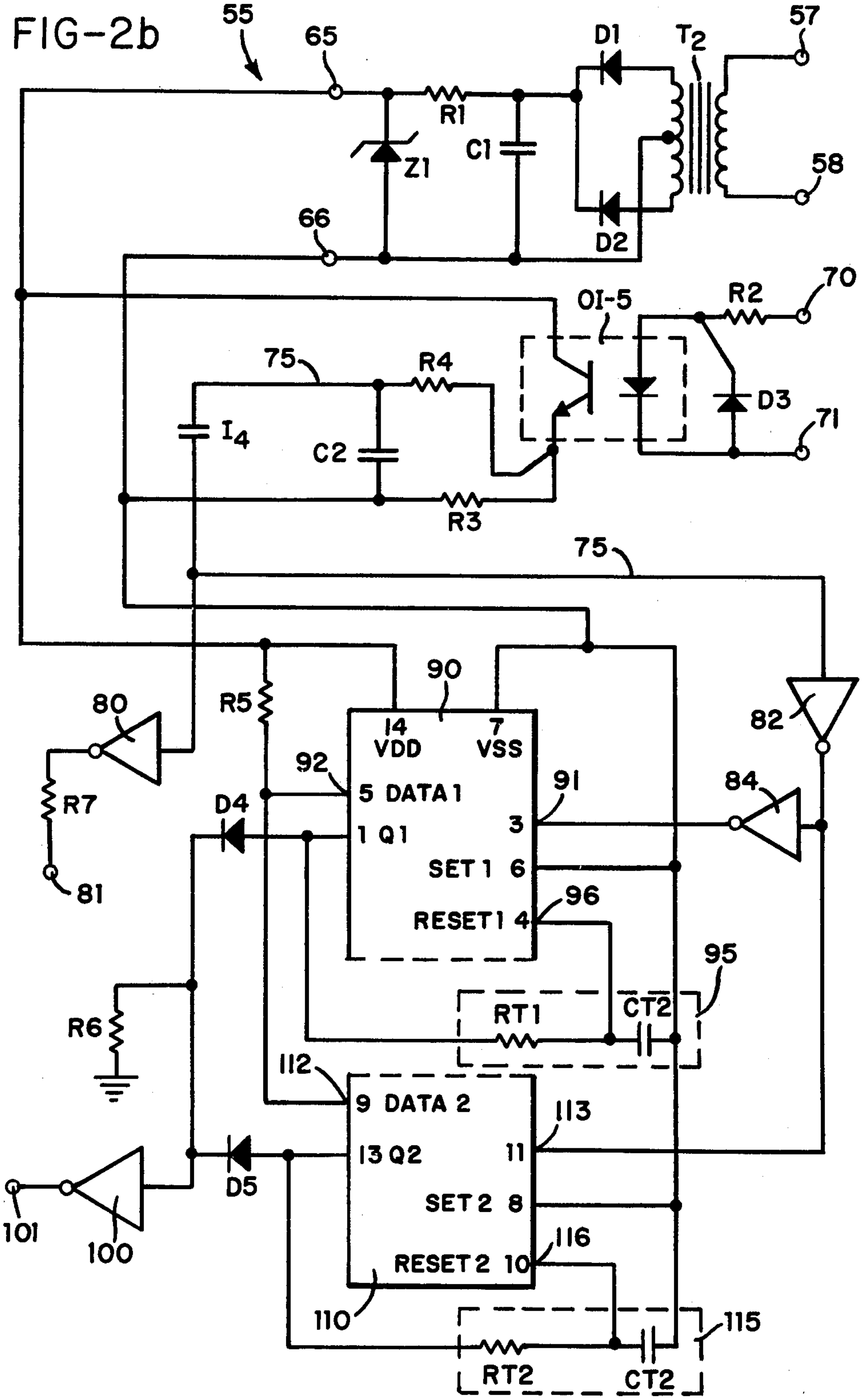
Figure 4A:
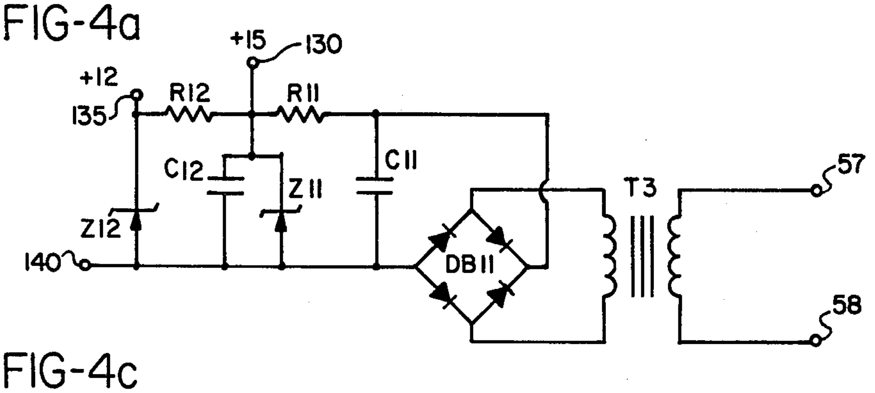
FIGS. 4*a*, 4*b* and 4*c* together comprise an electrical schematic diagram of another embodiment of the invention.
Figure 4C:
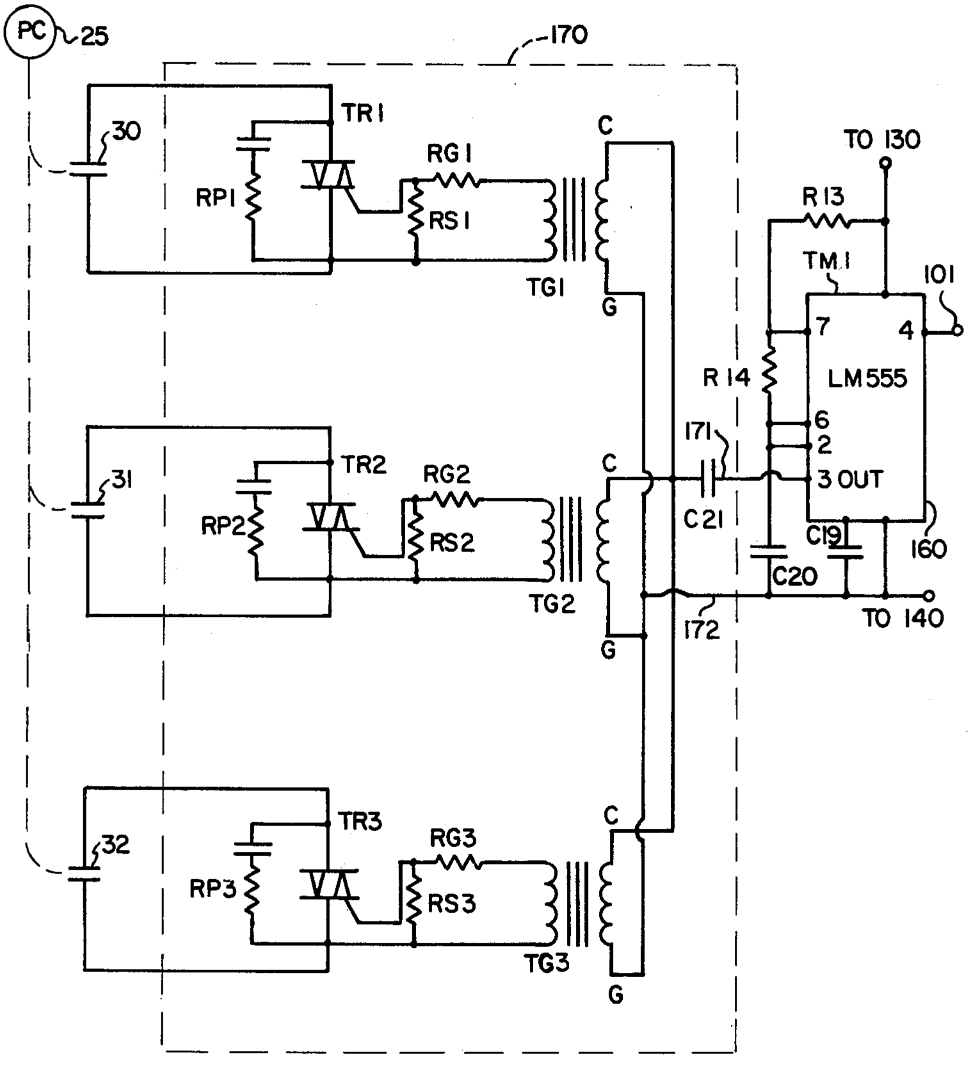
Figure 4B:
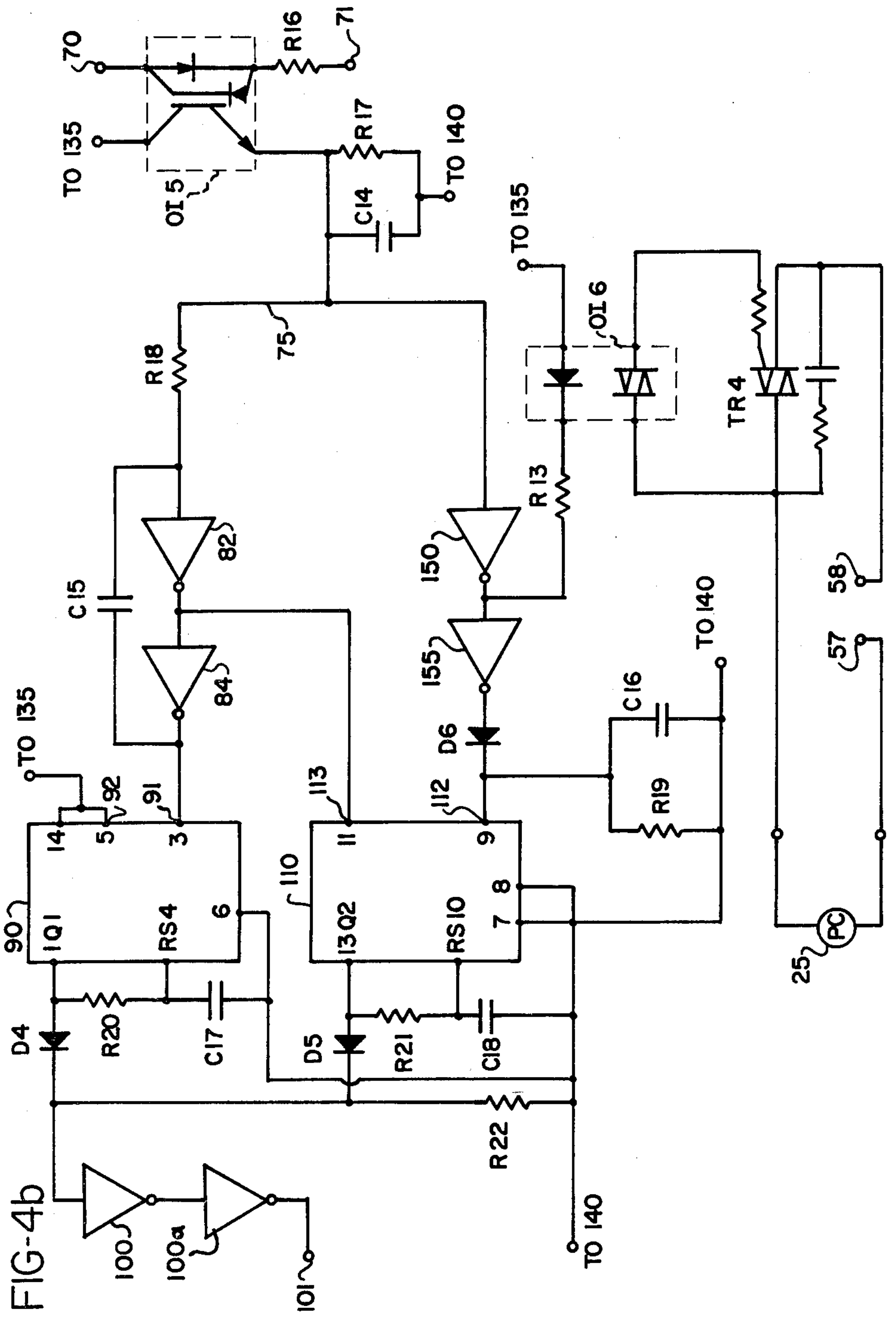

Referring now to the embodiment of the invention illustrated in FIGS. 4*a*-4*c*, this embodiment is similar in many ways to that shown in FIGS. 2*a*-2*c*. Common reference numerals will be used to represent common components. FIG. 4A represents a power supply in which the primary winding of transformer T3 is connected to a source of 120 volts AC power via terminals 57 and 58. The secondary winding is connected to bridge rectifier DB11, and its output is connected to filter capacitor C11 and a first voltage regulating circuit which includes resistor R11, capacitor C12 and zenor diode Z11. This circuit provides a regulated 15 volt output at terminal 130. A second regulator circuit including resistor R12 and zenor diode provides a regulated 12 volt output at terminal 135. Terminal 140 is common.

The control signal from an external source is applied to terminals 70 and 71, shown in FIG. 4*b*, and this control signal, which is usually an alternating current signal, is connected to an optical isolator OI-5.

The output of the optical isolator OI-5 is applied on line 75 to inverter circuits 82 and 84. The output of inverter 84 is connected to the clock input 91 of the circuit means 90, and this causes whatever input is applied to terminal 92, in this case plus 12 volts, to be transferred to the Q1 output, and through diode D4 and inverters 100 and 100*a* to the output terminal 101.

At the same time, the signal on the control line as applied through inverter 150, to optical isolator OI-6, the output of which controls the gate of triac TR4 which in turn applies current to the solenoid or coil of the power contactor 25. Thus, upon the application of a control signal to terminal 70, 71, the power contactor coil 25 is energized, and a signal will appear at terminal 101 for a limited period of time as determined by the value of capacitor C17 and resistor R20. With the components as shown in this embodiment, this output pulse is on the order of 50 milliseconds.

Upon the removal of a control signal from terminals 70, 71, power will be removed from the solenoid of the power contactor 25, and at the same time, the output of inverter 82 will be applied to the clock input 113 and this will cause a second output pulse to appear at terminal 101. The duration of this pulse is also 50 milliseconds and is determined by the value of capacitor C18 and resistor R21. The output signals at terminal 101 are applied to an oscillator circuit 160 shown in FIG. 4*c* which turns on and oscillates at approximately 20 kHz for the duration of the output pulse. Therefore, a burst of 20 kHz signal is coupled through capacitor C21 to pulse transformers TG1, TG2, TG3. Since this pulse is capacitively coupled, any DC component of the burst signal is eliminated and only alternating current is applied to the transformers and to the gate controlled thyristors.

The secondary winding of the pulse transformers are connected directly to the gate electrodes of the triacs TR1, TR2, and TR3 which are connected in parallel with the power contacts 30, 31 and 32.

One advantage of the circuit of FIGS. 4*a*-4*c* is that it makes it possible to use the same gate circuit for many different types of applications. Since the gate control circuit 170 may be included on a single printed circuit board, only two leads 171, 172, are required to connect the circuit 170, or power module, to the remainder of the device. The power module 170 may include all triacs, resistors and pulse transformers in a single potted assembly. The transformers provide line to line isolation and isolation of all power lines from the gate control board 180. Since the transformers can be built for any voltage breakdown level, it is possible to use this system for high voltage applications.

While triacs are illustrated in FIG. 4*c*, SCR's can be employed by using six separate transformers with one in each gate circuit. It is also possible to use three transformers with dual secondaries with a lesser voltage breakdown voltage between the two secondaries since they are in the same phase. This will further lower cost.

The pulse transformers may be designed to provide any current required to operate properly the gates of the thyristors. If more drive power is needed than is available from the oscillator TM1, a transistor amplifier may be added to develop any power required for multiple SCR applications. The amplifier could be added to the power module 170 while the gate control circuit would remain unchanged.

Another advantage is in high voltage applications of over 1000 volts where it is necessary to place several triacs or SCR's in series. In this case, the gate transformers for all the series elements can have the primary windings in series so that the same current in magnitude and phase will flow through all primary windings and simultaneously gate all series elements. This is necessary in a series connection so that one series element is not gated on before any other since this would apply over voltage to the ungated units.

Since the "burst" of 20 kHz gating energy is connected so the signal to the gate circuit swings both plus and minus relative to the output terminal of the triac, it automatically eliminates the difference in sensitivity normally experienced in a triac when operating in different quadrants. Almost all triacs require a different gate current in the fourth quadrant operation. Usually the current required in the 4th quadrant is 150% to 200% that required in quadrant I. Some units require the same difference between the current needed in the 1st and 3rd quadrants and that needed in the 2nd and 4th quadrants. In this embodiment, this differential is of no concern since if the triac does not turn on on the positive pulse, it will turn on on the negative pulse which is only 1/40000 second later. This reduces the gate drive power required since it is not necessary to design for the low sensitivity quadrants.

In those applications where multiple turn-on of the triac at very low line voltages (due to the gate pulses turning on the triac at a voltage so low that the triac may turn off again between pulses) may create a line transient that is objectionable, a diode bridge and small capacitor filter may be added in the secondary circuit of the gate transformer to supply DC to the gate. The capacitor can be very small because of the high frequency being filtered and the delay which results would only be for the duration of one or two cycles of the 20 kHz signal. The advantage of the multiple quadrant operation described above would be lost, but all other advantages would remain.

A protection circuit is provided to prevent a gate signal from accidently being initiated whenever power to terminals 57 and 58 is interrupted while power to the main contactor circuit is turned on. This circuit includes inverter 155, diode D6, capacitor C16 and resistor R19. With the circuit shown, terminal 112 of circuit 110 (pin 9) is kept at zero voltage until there has been and "ON" input to the control input (terminals 70,71) which will make the output of 82 go to zero and the output of inverter 155 go high. The output of inverter 155 will charge capacitor C16 through D6 and hence provide a data input to circuit 110. When the control signal is removed, the output of 82 will go high providing a clock pulse to 110 and hence an output from Q2. Simultaneously, the output of inverter 155 will go low, but C16 will hold the data input 112 high long enough for the "OFF" cycle to be completed. After this period C16 will discharge through R19 and the data input 112 will again be zero.

The following table lists the components, and their values, used in the embodiment shown in FIGS. 4a and 4c.

TABLE OF COMPONENTS (FIG. 4)

| RESISTORS (in ohms) | | CAPACITORS (in mfd) | |
|---|---|---|---|
| R11 | 10 | C11 | 100, 25V |
| R12 | 50 | C12 | 150, 25V |
| R13 | 560 | C13 | 0.1 |
| R14 | 390 | C14 | 4.7, 15V |
| R15 | 100 | C15 | .022 |
| R16 | 10K | C16 | 0.47 |
| R17 | 10K | C17 | 0.47 |
| R18 | 120K | C18 | 0.47 |
| R19 | 220K | C19 | 0.01 |
| R20 | 133K | C20 | 0.001 |
| R21 | 133K | C21 | 0.15 |
| R22 | 33K | C22 | |
| R23 | 10K | | |
| R24 | 33K | CP1-CP3 | 0.02 |
| RG11-RG13 | 56 | | |
| RP11-RP13 | 100 | | |
| RS11-RS13 | 100 | | |

OTHER COMPONENTS

| | |
|---|---|
| DB11 | Bridge Rectifier, 50V General Instrument WOO5M |
| Z11 | 15V, HEP Z2519 |
| Z12 | 12V, 1N4792 |
| TM1 | Oscillator, LM555 |
| 90, 110 | Data transfer flip-flop 4013 |
| 150, 155 | Inverters, CD-4049 |
| OI-5 | Optical isolator, H 11AA1 |
| OI-6 | Optical isolator, MOC 3011 |
| TR-4 | Q4010L4 Teccor |
| TG1-TG | Pulse Transformer, Teccor 8001074 Ratio 1:1 |
| TR11-TR13 | Unitrode 800V, 20A Chipstrate L2806208S |

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. Apparatus adapted to be connected to an existing power contactor without modification thereof, which power contactor includes a solenoid connected to operate at least one pair of power contacts, said apparatus controlling the operation of the power contactor in response to an externally generated control signal and for suppressing arcing at the power contacts during opening and closing thereof, said apparatus including gate controlled thyristor means connectable in parallel with each of said power contacts, means for providing a source of direct current for the gate of said thyristor means, circuit means responsive to the application of the control signal including means for applying current to the solenoid of said power contactor and further including first solid state gate circuit means having a substantially immediate output of predetermined duration in response to the application of the control signal for applying gating current to said thyristor means prior to, during, and for a limited period of time following closure of the power contacts, and said circuit means also being responsive to the removal of the control signal for removing current from the solenoid and further including second solid state gate circuit means having a substantially immediate output of predetermined duration in response to the removal of the control signal for applying gating current to said thyristor means prior to, during, and for a limited period of time following the opening of the power contacts.

2. The apparatus of claim 1 further including means responsive to the application of the control signal for connecting said thyristor means in parallel with the power contacts prior to gating current being applied to said thyristor means, and responsive to the removal of the control signal for disconnecting said thyristor means after said power contacts have opened and gating current has been completely removed from said thyristor means.

3. The apparatus of claim 1 further including means for isolating said control signal from said first and second solid state circuit means.

4. In an apparatus for connection to a power contactor of the type including a solenoid connected to operate at least one pair of power contacts, said apparatus controlling the operation of the power contactor in response to an externally generated control signal and for suppressing arcing at the power contacts during opening and closing thereof, said apparatus including gate controlled thyristor means connectable in parallel with each of said power contacts, the improvement comprising means for providing a source of current of sufficient magnitude to gate said thyristor means into the conducting state independently of the polarity of the voltage applied to said thyristor, circuit means responsive to the application of the control signal including means for applying current to the solenoid of said power contactor and further including first solid state gate circuit means having a substantially immediate output of predetermined duration in response to the application of the control signal for applying said gating current to said thyristor means prior to, during, and for a limited period of time following closure of the power contacts, and said circuit means also being responsive to the removal of the control signal for removing current from the solenoid and further including second solid state gate circuit means having a substantially immediate output of predetermined duration in response to the removal of the control signal for applying said gating current to said thyristor means prior to, during, and for a limited period of time following the opening of the power contacts.

5. The apparatus of claim 4 wherein said gating current is provided by a source of high frequency alternating current of sufficient magnitude to gate said thyristor means into the conducting state.

6. The apparatus of claim 5 further including pulse transformers having primary windings connected to the output of said source of high frequency alternating current and secondary windings connected to the gate electrodes of said thyristor means.

7. The power contactor of claim 4 wherein said gating current is provided by a source of direct current.

8. The apparatus of claim 4 wherein said gate controlled thyristor means is a triac.

9. The apparatus of claim 4 wherein said power solenoid has three pairs of power contacts for controlling the current in a three phase circuit.

10. In an apparatus for connection to a power contactor of the type including a solenoid connected to operate at least one pair of power contacts, said apparatus controlling the operation of the power contactor in response to an externally generated control signal and for suppressing arcing at the power contacts during opening and closing thereof, said apparatus including gate controlled thyristor means connectable in parallel with each of said power contacts, the improvement comprising gating current means for providing a source of high frequency alternating current of sufficient magnitude to gate said thyristor means into the conducting state substantially immediately upon the application of the gate current to said thyristor means, circuit means responsive to the application of the control signal including means for applying current to the solenoid of said power contactor and further including first solid state gate circuit means having a substantially immediate output of predetermined duration in response to the application of the control signal for applying said gating current to said thyristor means prior to, during, and for a limited period of time following closure of the power contacts, and said circuit means also being responsive to the removal of the control signal for removing current from the solenoid and further including second solid state gate circuit means having a substantially immediate output of predetermined duration in response to the removal of the control signal for applying said gating current to said thyristor means prior to, during, and for a limited period of time following the opening of the power contacts.

11. In an apparatus for connection to a power contactor of the type including a solenoid connected to operate at least one pair of power contacts, said apparatus controlling the operation of the power contactor in response to an externally generated control signal and for suppressing arcing at the power contacts during opening and closing thereof, said apparatus including gate controlled thyristor means connectable in parallel with each of said power contacts, the improvement comprising circuit means responsive to the application of said control signal including means for applying energization current to said power contactor solenoid and further including first solid state gate circuit means having a substantially immediate output of predetermined duration in response to the application of the control signal for generating a first output signal which exists for a period of time prior to, during, and for a limited period of time following the closure of said power contacts, said circuit means also being responsive to the removal of the control signal for removing current from said power contactor solenoid and further including second solid state gate circuit means having a substantially immediate output of predetermined duration in response to the removal of the control signal for generating a second output signal which exists for a period of time prior to, during, and for a limited period of time following the opening of the power contacts, oscillator means responsive to either said first or said second output signal fr generating a source of high frequency alternating current, and means for connecting the output of said oscillator to the gate electrode of said thyristor means.

12. The apparatus of claim 11 wherein said connecting means includes pulse transformers having primary windings connected to the output of said oscillator means and secondary windings connected to the gate electrodes of each said thyristor means.

* * * * *